(12) United States Patent
Yovichin et al.

(10) Patent No.: US 7,189,298 B1
(45) Date of Patent: Mar. 13, 2007

(54) HOT FORMING SYSTEM TO PRODUCE PRE-CURED INNERLINERS

(75) Inventors: Albert James Yovichin, Copley, OH (US); Daniel Ray Downing, North Canton, OH (US); James Alfred Benzing, II, North Canton, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 928 days.

(21) Appl. No.: 09/831,393

(22) PCT Filed: Nov. 25, 1998

(86) PCT No.: PCT/US98/25239

§ 371 (c)(1),
(2), (4) Date: Aug. 20, 2001

(87) PCT Pub. No.: WO00/30838

PCT Pub. Date: Jun. 2, 2000

(51) Int. Cl.
*B29D 30/00* (2006.01)

(52) U.S. Cl. ............ 156/110.1; 152/510; 264/175

(58) Field of Classification Search ........... 156/110.1, 156/123, 133, 134, 130.5, 118, 122; 152/510, 152/511, DIG. 16
See application file for complete search history.

(56) References Cited

U.S. PATENT DOCUMENTS

| | | | |
|---|---|---|---|
| 1,471,588 A | 10/1923 | Bourn | |
| 1,683,669 A | 9/1928 | Henderson | |
| 2,469,633 A | 5/1949 | Corson | 154/9 |
| 2,688,996 A * | 9/1954 | Loomis | 156/134 |
| 3,027,289 A | 3/1962 | Gitzinger | 156/132 |
| 3,478,138 A | 11/1969 | Friesner | 264/145 |
| 4,065,338 A | 12/1977 | Mirtain | 156/123 |
| 4,089,360 A * | 5/1978 | Böhm | 156/123 |
| 4,147,577 A | 4/1979 | Kobayashi et al. | 156/123 |

(Continued)

FOREIGN PATENT DOCUMENTS

DE 4434270 3/1996

(Continued)

OTHER PUBLICATIONS

International Search Report.

(Continued)

*Primary Examiner*—Geoffrey L. Knable
(74) *Attorney, Agent, or Firm*—Brouse McDowell; Roger D. Emerson; Heather M. Barnes

(57) ABSTRACT

Method for providing precured innerliners (50) having a predetermined cross sectional profile for use as part of a pneumatic tire assembly used in a bladder-less shaping and vulcanizing mold. The innerliner (50) is formed from a continuous strip of elastomeric material (12) hot formed using a calender assembly (10) with a profiled calender roller (16). The formed strip is cured "in-line" in a press (38) having a profile matching platen (80) before being wound onto a tire building drum (48). After the pneumatic tire assembly is completed, the assembly is shaped and cured in a bladder-less mold, utilizing the precured innerliner as the impervious inner layer. Initially, the center region (62) of the innerliner is at least twice as thick as the lateral regions (72, 74). In the finished pneumatic tire, the innerliner exhibits a uniform thickness.

5 Claims, 7 Drawing Sheets

U.S. PATENT DOCUMENTS

| | | | |
|---|---|---|---|
| 4,166,883 A | 9/1979 | Sieberling | 428/495 |
| 4,359,354 A | 11/1982 | Böhm | 156/115 |
| 4,783,230 A | 11/1988 | Perkins | 156/117 |
| 4,877,468 A | 10/1989 | Siegenthaler | 156/111 |
| 5,762,740 A | 6/1998 | Benzing, II et al. | 156/133 |

FOREIGN PATENT DOCUMENTS

| | | |
|---|---|---|
| FR | 2526707 | 5/1982 |
| GB | 996385 | 6/1965 |
| GB | 2224031 | 4/1990 |

OTHER PUBLICATIONS

Article concerning Double Belt Presses.

\* cited by examiner

HOT FORMING SYSTEM TO PRODUCE PRE-CURED INNERLINERS

TECHNICAL FIELD

This invention pertains to components for pneumatic tires, and more specifically to a method for forming a precured innerliner and the use of the innerliner in the manufacture of pneumatic tires.

BACKGROUND ART

To better understand the advantages and improvements achieved with the present invention, a brief discussion of tire construction and building procedures follows. A pneumatic tire is typically constructed by applying various components, or plies of the tire as flat stock, upon a rotating tire building drum to form a hollow, toroidal shaped green or uncured tire. The order of applying the components is as follows: first, an innerliner is wrapped upon the tire building drum; the innerliner is followed by carcass plies containing tire reinforcement, the carcass plies are followed (not necessarily in the following order) by the beads, apexes, chaffers, side walls, belts and tread. The components are then expanded and formed into a toroidal shaped, green tire assembly, in a manner well known in the art. The green tire assembly is then removed from the tire building drum and placed into a shaping and vulcanizing mold having the shape of the finished tire.

In the conventional manner, the mold is sealed and the toroidal shaped green tire assembly is heated and expanded radially outward into the mold periphery by injecting pressurized gas or fluid into a curing bladder mounted within the mold and disposed within the green tire assembly. As the curing bladder expands, it forces the tread and sidewalls of the green tire assembly into contact with the heated mold walls to shape and vulcanize the green tire assembly into a fully vulcanized tire. During the radial expansion of the green tire assembly within the shaping and vulcanizing mold, the toroidally shaped plies expand radially outward to dimensions beyond those of the original green tire assembly. Therefore, the bladder is usually made of an expandable elastomeric material, such as butyl rubber, which also provides resistance to the steam or hot water used to force the tire against the mold surface.

During the production of tires on an assembly line, the curing bladder within the shaping and vulcanizing mold periodically wears out or fails. The tire industry has tried to eliminate the need for a curing bladder used in tire production. U.S. Pat. No. 4,166,883 discloses a method of forming a cured tire in a mold without a bladder. Instead of a bladder, the liner functions as the impervious layer. The liner is cured or partially cured to produce a steam- and water-resistant surface before the remainder of the tire is cured in a mold. The curing or partial curing is accomplished by electron irradiation.

In an effort to eliminate several steps involved in the tire building process, U.S. Pat. No. 5,762,740 discloses a method and apparatus for simultaneously forming, positioning, attaching and conveying a plurality of continuous strips of elastomeric tire components to adjacent strips of tire components as they are conveyed. This "contoured calendaring" process produces a laminate suitable for use as a subassembly for a pneumatic tire. The apparatus employs a plurality of calender rollers and each tire component has a predetermined cross sectional profile formed by a component-forming depression on an associated calender roller. Each component of the subassembly is in an uncured state prior to the subassembly being placed in the shaping and vulcanizing mold.

The present invention is directed to a method for providing a pre-cured innerliner for use in a pneumatic tire subassembly in order to provide the advantages of use of a bladder-less shaping and vulcanizing mold. Although the methods described herein are applicable to any size of finished pneumatic tire, the invention is specifically directed to methods for forming off-road and farm tires having large nominal rim diameters. It is appreciated by those skilled in the art that practices useful for passenger and light truck pneumatic tires are not always practical to apply to large off-the-road earthmover or farm vehicle tires.

OBJECTS AND SUMMARY OF THE INVENTION

It is an object of the present invention to provide an innerliner for a pneumatic tire, the innerliner being as defined in one or more of the appended claims and, as such, having the capability of being constructed to accomplish one or more of the following subsidiary objects.

It is an object of the present invention to provide a method for providing a precured innerliner for a tire assembly. The method includes the steps of providing calendaring means for forming a continuous strip of elastomeric material and curing means for curing said elastomeric material. The calendaring means is able to form a continuous strip of elastomeric material having a predetermined cross sectional profile. The method is characterized by the steps of utilizing the calendaring means to provide a continuous strip of elastomeric material having a cross-sectional profile including a center region bounded by first and second lateral regions, the center region having a thickness at least twice a thickness of the first lateral region, utilizing the curing means to cure a predetermined portion of the continuous strip of elastomeric material, winding said predetermined portion onto an associated tire building drum after the predetermined portion is cured, cutting said predetermined portion to provide an innerliner length having splice surfaces at each end after cure, and forming said innerliner by joining said splice surfaces.

It is a further object of the invention to provide a precured innerliner for a tire assembly for use in an associated bladder-less shaping and vulcanizing mold, the innerliner characterized by a cross-sectional profile having a center region bounded by first and second lateral regions, the center region having a thickness at least twice a thickness of the first lateral region.

It is a further object of the invention to provide a profiled innerliner for a tire assembly for use in an associated bladder-less shaping a vulcanizing mold, the innerliner characterized by a cross-sectional profile having a center region bounded by first and second lateral regions, the center region having a thickness at least twice a thickness of the first lateral region, wherein the innerliner in precured in a splice region.

One advantage of the present invention is that the pre-cured innerliner is formed in a continuous process including contoured calendaring of the elastomeric material and providing in-line curing.

Another advantage of the present invention is that the inventive methods allow the use of a bladder-less shaping and vulcanizing mold for pneumatic tires having large nominal rim diameters.

Another advantage of the present invention is that the profile of the innerliner before use in the bladder-less mold reduces the need for multi-layered innerliners for pneumatic tires having large nominal rim diameters.

Still other benefits and advantages of the invention will become apparent to those skilled in the art upon a reading and understanding of the following specification.

BRIEF DESCRIPTION OF THE DRAWINGS

The invention may take physical form in certain parts and arrangement of parts, a preferred embodiment of which will be described in detail in this specification and illustrated in the accompanying drawings which form a part hereof and wherein.

DEFINITIONS

"Axial" and "axially" means lines or directions that are parallel to the axis of rotation of the tire.

"Carcass" means an unvulcanized laminate of tire ply material and other tire components cut to length suitable for splicing, or already spliced, into a cylindrical or toroidal shape. Additional components may be added to the carcass prior to its being vulcanized to create the molded tire.

"Casing" means the tire carcass and associated tire components excluding the tread.

"Circumferential" means lines or directions extending along the perimeter of the surface of the annular tread perpendicular to the axial direction.

"Equatorial Plane (EP)" means the plane perpendicular to the tire's axis of rotation and passing through the center of its tread.

"Lateral" means an axial direction.

"Radially" and "radially" means directions radially toward or away from the axis of rotation of the tire.

"Radial Ply Tire" means a belted or circumferentially-restricted pneumatic tire in which the ply cords which extend from bead to bead are laid at cord angles between 65° and 90° with respect to the equatorial plane of the tire.

"Sidewall" means that portion of a tire between the tread and the bead.

"Tread" means a rubber or elastomeric component which when bonded to a tire carcass includes that portion of the tire that comes into contact with the road when the tire is normally inflated and under normal load.

DETAILED DESCRIPTION OF THE INVENTION

Figure 1:
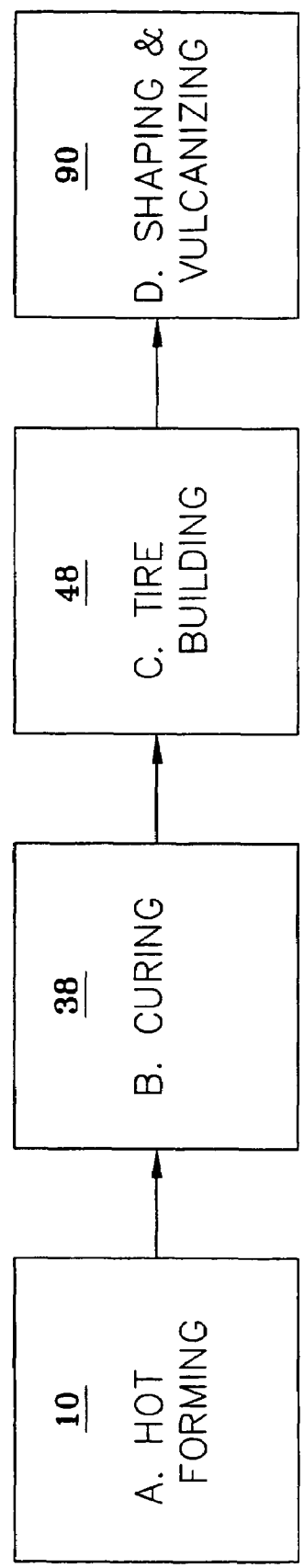
FIG. 1 is a schematic representation of the inventive process for providing a precured innerliner for a pneumatic tire assembly.

Referring now to the drawings wherein the showings are for purposes of illustrating a preferred embodiment of the invention only and not for purposes of limiting the same, FIG. 1 is a schematic representation of a process for forming a pneumatic tire. The preferred embodiment of the invention is used to form pneumatic tires having large nominal rim diameters such as for off-road and farm vehicles. The innerliners for such vehicles may be in the range of 10 feet wide and 15 feet long and weigh up to 225 pounds. Utilizing molding techniques would require handling cylindrical innerliners having 10 foot widths and 5 foot diameters. In the preferred embodiment of the present invention, the steps outlined in FIG. 1 are a continuous process. In one embodiment of the invention, a contoured calendaring apparatus 10 is utilized to form a continuos strip of elastomeric material which is conveyed toward curing means 38. After cure, the elastomeric material is wound onto a tire building drum 48 to form a pre-cured innerliner. The pneumatic tire assembly is then built in a conventional manner and placed into a shaping and vulcanizing mold. In the preferred embodiment, the elastomeric material is natural gum, although a multi-component material could be used.

In an alternate embodiment of the invention, after cure, the elastomeric material is wound onto storage rolls and subsequently wound onto the tire building drum 48.

Figure 2:
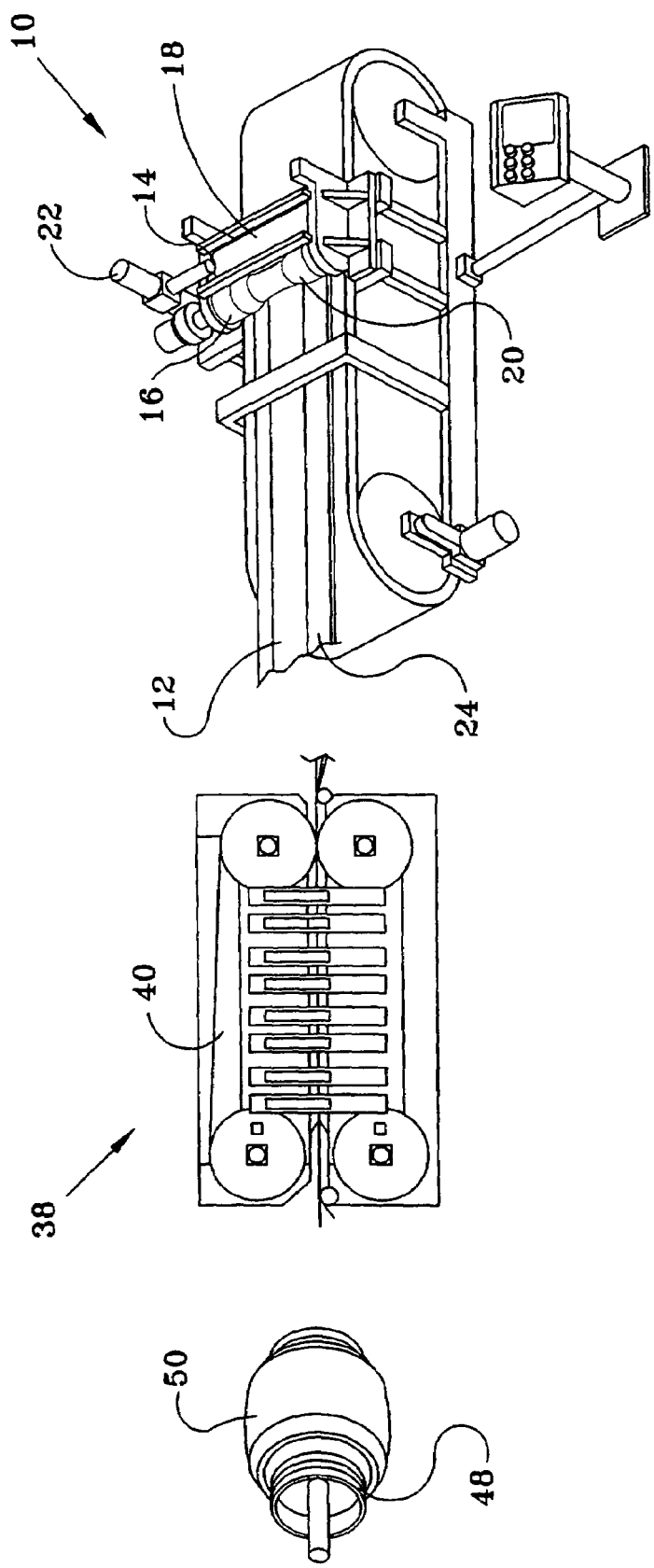
FIG. 2 is a perspective view of an assembly system.
Figure 3:
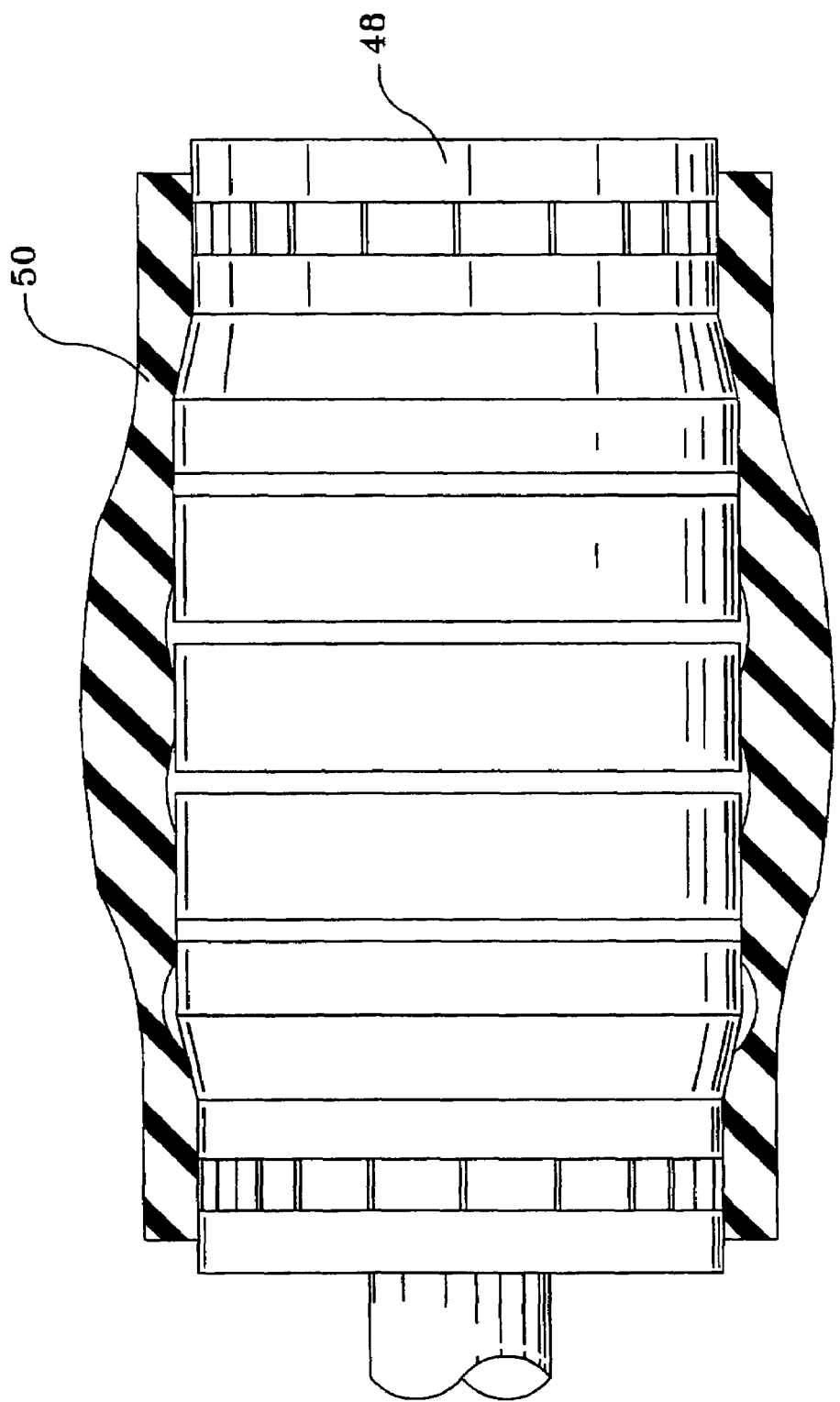
FIG. 3 is a front view of a tire building drum showing the inventive innerliner in cross section.

With reference to FIG. 2, a calendaring apparatus 10 is provided which is able to provide a continuous strip 12 of elastomeric material similar to an apparatus shown and described in U.S. Pat. No. 5,762,740, the entirety of which is incorporated herein by reference. In the preferred embodiment, the calendaring apparatus 10 includes a calender assembly 14 having a first calender roller 16 and a second calender roller 18. First calender roller 16 includes a profile-forming surface 20. The calendaring apparatus 10 includes delivery means 22 for delivering elastomeric material to the nip between first and second calender rollers 16,18. The preferred embodiment further includes conveying means 24 for conveying the formed continuous strip 12 away from the calender assembly 14. The formed continuous strip 12 is conveyed toward curing means 38. In the preferred embodiment, a press 40 is utilized to cure a predetermined portion of the continuous strip 12. The cured portion has a length equal or greater than the circumference of an associated tire building drum. For the purposes of the present invention, this step is referred to as "in line curing". In the preferred embodiment, the pre-cured portion of elastomeric material is wound onto the associated tire building drum 48 to form innerliner 50 shown in cross-section in FIG. 3.

Figure 4:
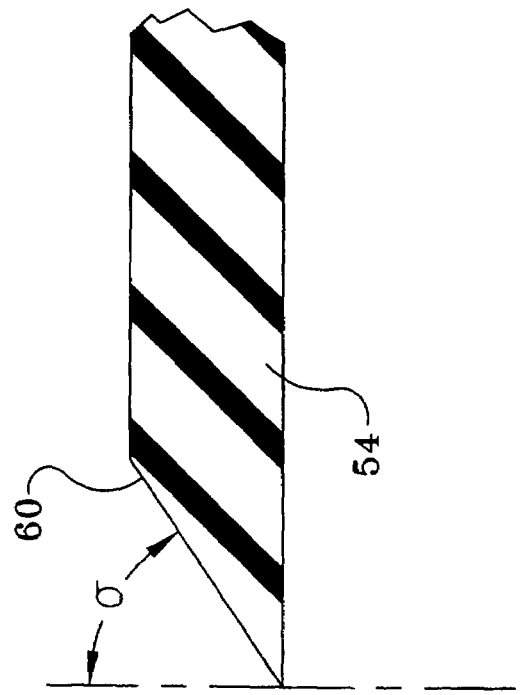
FIG. 4 is a cross-sectional view of the ends of the inventive innerliner illustrating the splice angle and splice surfaces.
Figure 4:
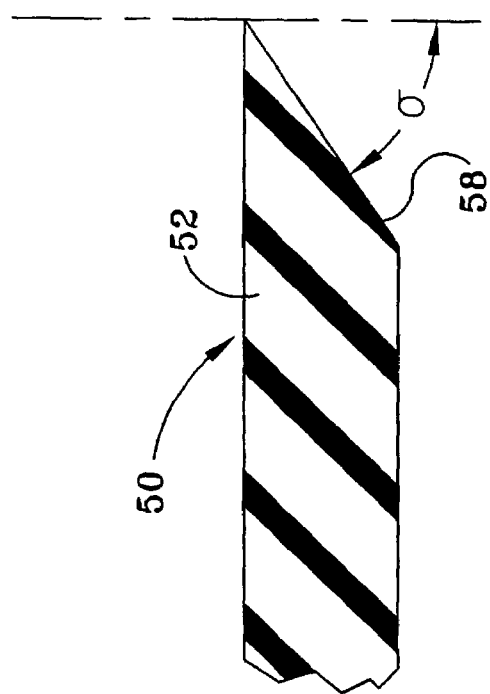

With reference to FIG. 4, the ends 52,54 of innerliner 50 are cut to provide splice surfaces 58,60. In the preferred embodiment, the splice angle, θ, ranges from 0° to 85° degrees, with the most preferred angle being at least 80°. The splice surfaces 58,60 are joined by methods known in the art in order to form a cylinder that will become the innerliner 50 for the pneumatic tire. In the preferred embodiment, an adhesive is applied to the splice surfaces 52,54 and a cure bar (not shown) is utilized to cure the adhesive (not shown). It has been found that providing a splice angle of at least 80° provides a large surface area for the splice which provides advantages over butt splices or splices made with smaller surface areas.

An important aspect of the present invention is the use of a pre-cured innerliner 50 in the tire-forming process in order to eliminate the need for an inflatable bladder in an associated tire forming and vulcanizing mold.

Figure 5:
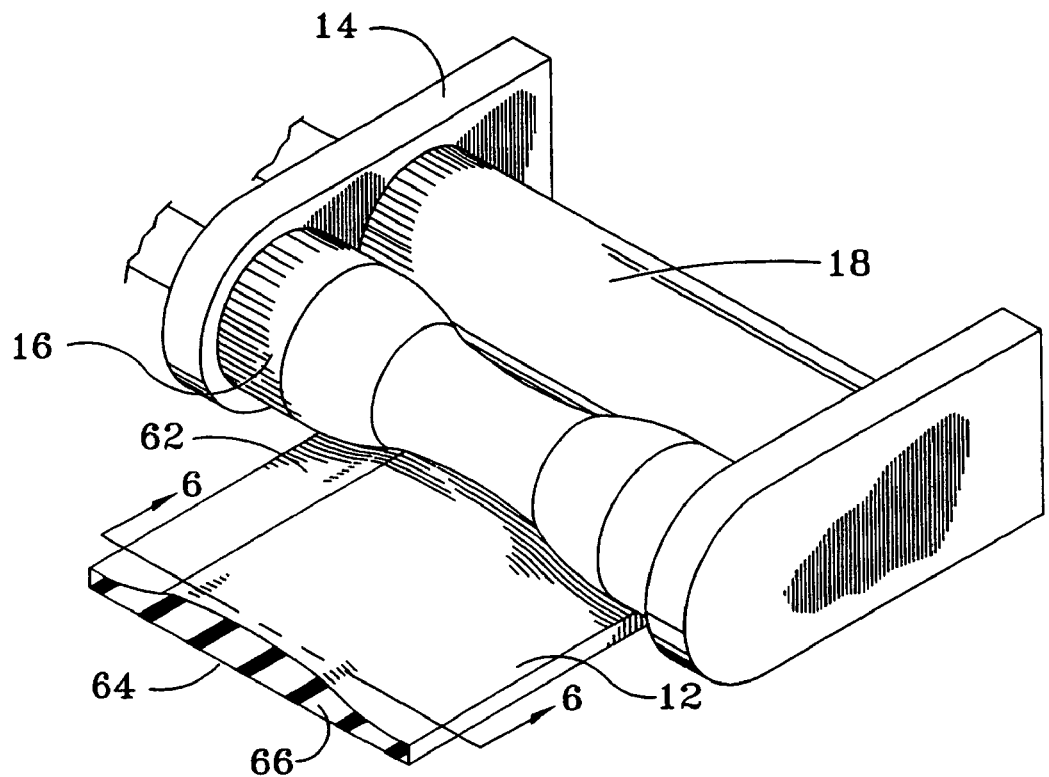
FIG. 5 is a perspective view of a calender roller assembly and the continuous elastomeric strip formed thereby.

With reference to FIG. 5, in the preferred embodiment, the first calender roller 16 produces profiled surface 62 on the continuous strip 12.

Figure 6:
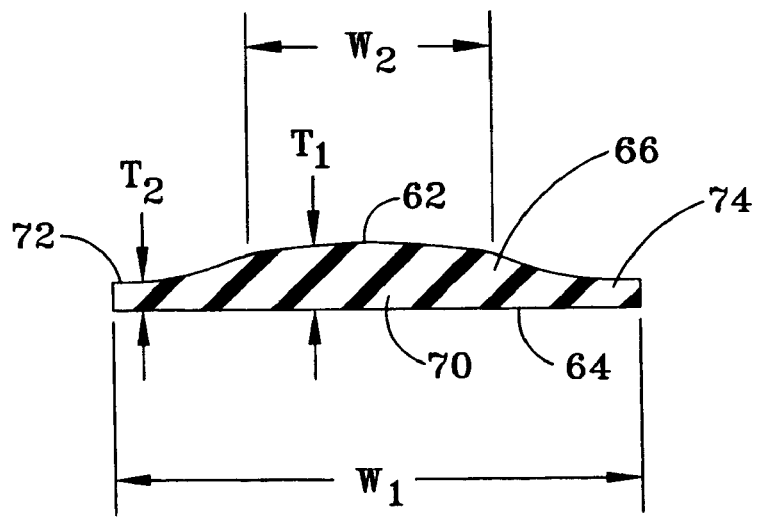
FIG. 6 is a cross-sectional view of the continuous strip shown in FIG. 5.

As best seen in FIG. 6, the continuous strip 12 of elastomeric material has a profiled surface 62 opposite a generally planar surface 64 resulting in a predetermined cross sectional profile 66. The preferred cross sectional profile 66 of the continuous strip 12 includes a center region 70 bounded by first and second lateral regions 72,74. The center region 70 is characterized by a first maximum thickness $T_1$ that is at least twice the minimum thickness $T_2$ of the first lateral region 72. In the preferred embodiment, the continuous strip 12 is associated with a lateral width $W_1$, with the center region 70 having a lateral width $W_2$ of approximately 0.5 to 0.75 $W_1$.

Figure 7:
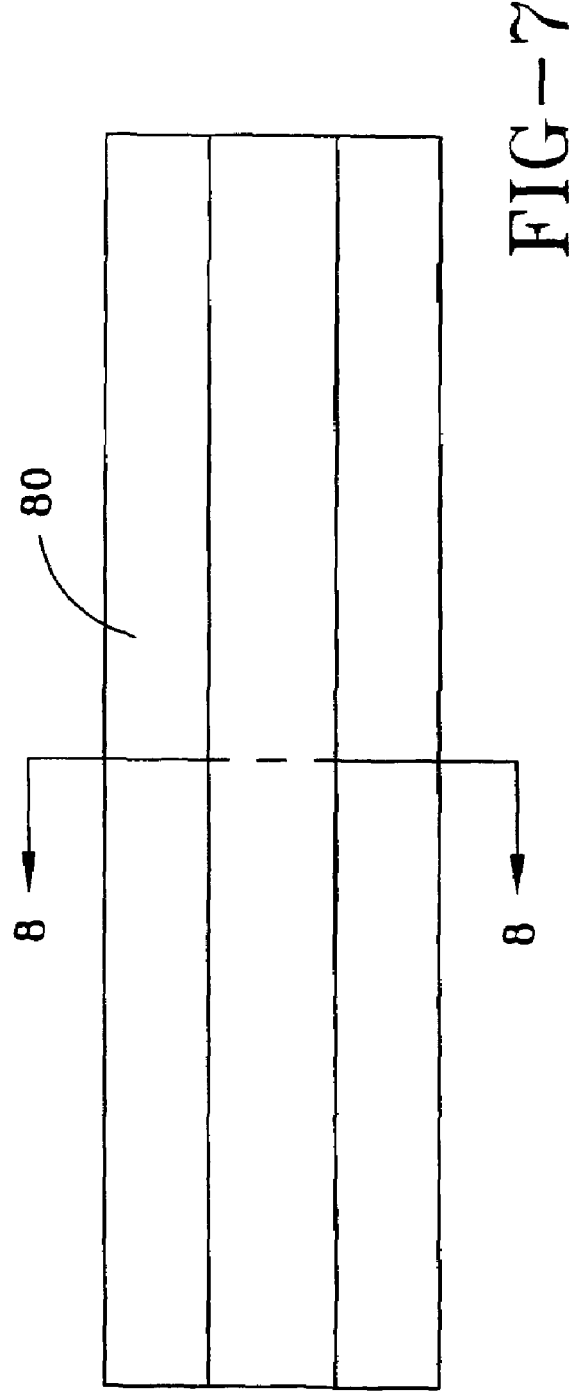
FIG. 7 is a top view of a press platen according to the invention.
Figure 8:
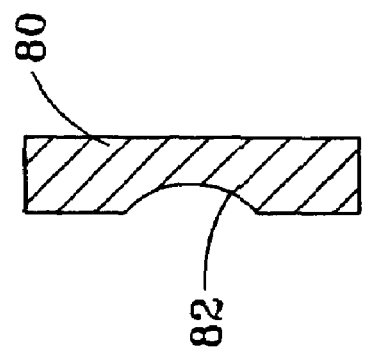
FIG. 8 is a cross-sectional view of the press platen shown in FIG. 7.

In order to accomplish the purposes of the invention, it is important that the predetermined cross-sectional profile 66 of the continuous strip 12 be preserved during the curing process. As shown in FIGS. 7 and 8, the press 40 is equipped with a platen 80 having a pressing surface 82 which meets with the profiled surface 62 of the continuous strip 12. It is also within the scope of the present invention to provide the press platen with transverse fine grooves or other texturing to allow means for air to escape from between the innerliner and the tire carcass when they are molded together.

In an exemplary description of the building of a tire assembly on the tire building drum 48, the cured portion of continuous strip 12 is wound onto building drum 48. The cured portion is cut to form ends 52,54 having splice surfaces 58,60. The splice surfaces 58,60 are joined with an adhesive (not shown), and a cure bar (not shown) is utilized to cure the adhesive and set the splice using methods known in the art. A body ply (not shown) is run onto the drum 48 over innerliner 50, cut and stitched onto itself, as typically applied in the tire building art. As needed, additional carcass plies, followed by the tire beads, apexes, chaffers, side walls, belts, and a tire tread ply (all not shown), are added. The majority of the carcass materials, with the exception of the innerliner, are comprised of green, uncured rubber and can be stitched together by any conventional techniques and means. The building drum 48 is utilized in the usual manner to provide a toroidally shaped green tire assembly which is then removed for shaping and vulcanization in an associated curing mold.

Figure 9:
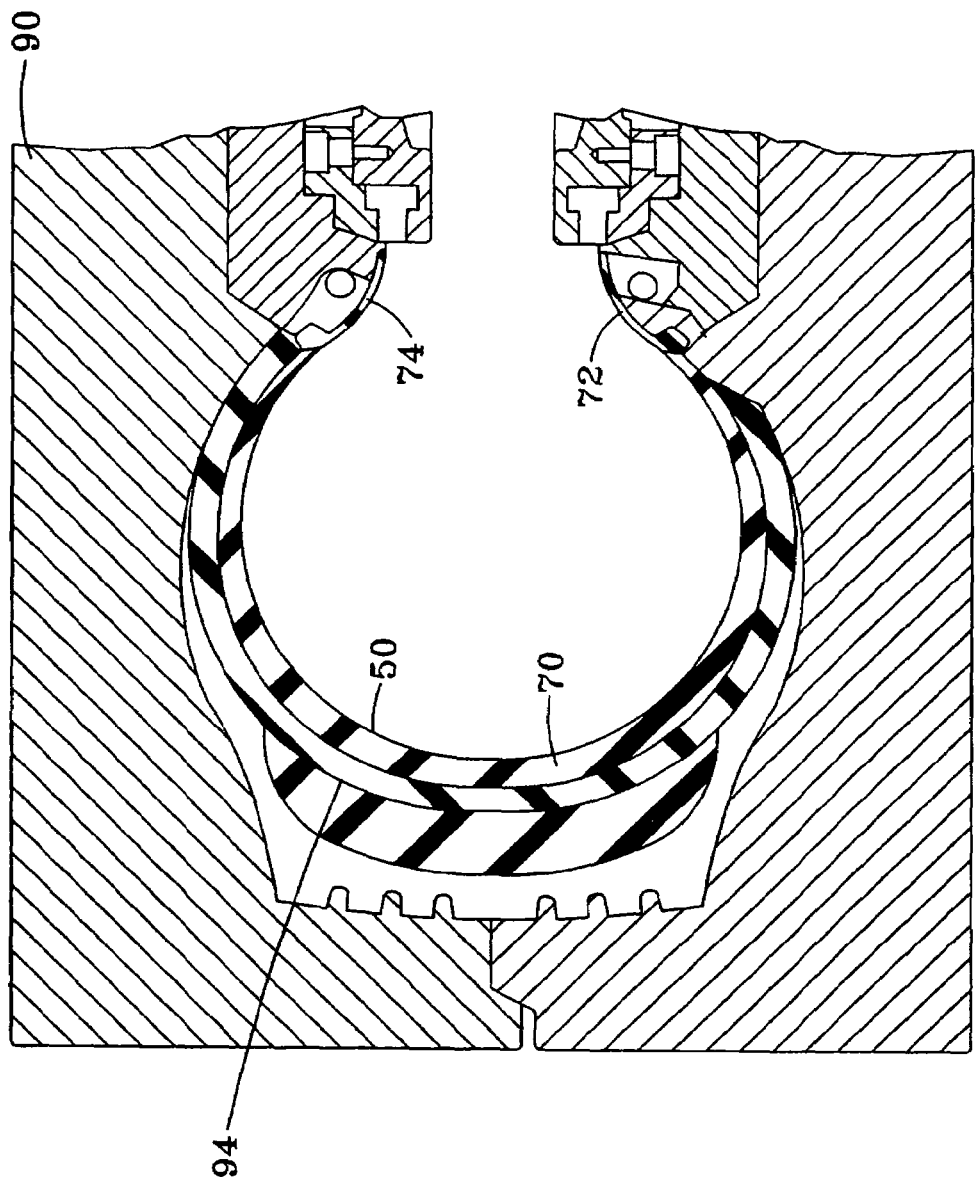
FIG. 9 is a partial cross-sectional view of a shaping and vulcanizing mold having a pneumatic tire assembly positioned therein.

Referring now to FIG. 9, a shaping and vulcanization mold 90 is shown in cross-section. An important aspect of the invention is that mold 90 does not require the use of a curing bladder to form a complete pneumatic tire. The mold 90 is constructed in any conventional manner and does not form a part of the present invention. The cured innerliner 50 forms the inner surface of the tire assembly 94 and is impervious to pressurized gas, steam, or hot water. The pressurized gas, steam or hot water is introduced into the mold 90 to provide sufficient pressure within the tire assembly 94 to force it against the mold wall and the innerliner 50 against the tire carcass so as to form a tread pattern in the tread portion and form any desired identification and indicia marks desired on the tire's surface. The tire assembly 94 is then cured and removed form the mold 90 in the form of a completed tire. During this process, the innerliner 50 is stretched to its final toroidal shape. Because center region 70 is subjected to the greatest amount of stretch, the center region 70 is initially at least twice as thick as the lateral regions 72,74. For large nominal rim sized pneumatic tires for earthmover or farm vehicles, the center region 70 of innerliner 50 may exhibit greater than 100% stretch in diameter in the shaping and vulcanizing mold. In the finally shaped tire, the innerliner 50 exhibits nearly a uniform thickness throughout.

In an alternate embodiment of the invention, the cured elastomeric material is wound onto a holding roll (not shown). In that way, a continuous strip of cured innerliner material is available to form the innerliners 50. In another alternate embodiment, a separation liner (not shown) may be utilized with the holding roll.

In yet another embodiment of the invention, the cured continuous strip 12 is cut to length and formed into a cylinder (not shown) before being loaded onto a tire building drum 48.

Referring to FIG. 2, in a further embodiment of the invention, the uncured profiled elastomeric strip 12 formed on calendaring apparatus 10 may be positioned onto tire building drum 48 without first passing through press 40. The material is therefore in an uncured state on the tire building drum 48. The material is then cut to length to provide splice surfaces 58 as 60, shown in FIG. 4. The splice region only of the innerliner 50 is precured using a cure bar or other apparatuses and methods known in the art before the remaining tire components are wound onto the drum. The innerliner 50 is then cured along with the remaining components in the shaping and vulcanizing mold 90. It is also within the scope of the present invention to wind the uncured profiled strip 12 onto holding drums, with or without separation liners, before winding onto the associated tire building drum 48.

The preferred embodiments of the invention have been described, hereinabove. It will be apparent to those skilled in the art that the above methods may incorporate changes and modifications without departing from the general scope of this invention. It is intended to include all such modifications and alterations in so far as they come within the scope of the appended claims or the equivalents thereof.

The invention claimed is:

1. A method for providing a precured innerliner (50) for a pneumatic tire assembly (94), said pneumatic tire assembly being built on an associated tire building drum (48) and subsequently mounted into an associated shaping and vulcanizing mold (90), the method including the steps of providing calendering means (10) for forming a continuous strip of elastomeric material and a press (40), comprising a press platen (80) for curing said continuous strip, said calendering means being able to form said continuous strip of elastomeric material having a predetermined cross sectional profile, the method characterized by the steps of:

utilizing said calendering means to provide said continuous strip (12) of elastomeric material having a cross-sectional profile (66) including a center region (70) bounded by first and second lateral regions (72,74), said center region having a maximum thickness $T_1$ at least twice a minimum thickness $T_2$ of said first lateral region;

providing said press platen with a pressing surface mating with a profiled surface (62) of said continuous strip (12);

utilizing said press to in-line cure a predetermined portion of said continuous strip of elastomeric material by engaging said press platen with said predetermined portion of said continuous strip to preserve said cross-sectional profile, said predetermined portion having a length equal to or greater than a circumference of said associated tire building drum;

winding said predetermined portion onto said associated tire building drum after said step of utilizing said curing means;

cutting said predetermined portion to provide splice surfaces (58,60) after said step of utilizing said curing means; and, forming said precured innerliner (50) by joining said splice surfaces.

2. The method of claim 1 further characterized by the step of:

winding said predetermined portion onto a holding roll before said step of winding said predetermined portion onto said associated tire building drum.

3. The method of claim 1 wherein said splice surfaces have a splice angle of at least 80°.

4. The method of claim 1 wherein said splice surfaces are joined with an adhesive.

5. A method for providing a precured innerliner (50) for a pneumatic tire assembly (94), said pneumatic tire assembly being built on an associated tire building drum (48) and subsequently mounted into an associated shaping and vulcanizing mold (90), the method including providing calendering means (10) for forming a continuous strip of elastomeric material having a predetermined cross-sectional profile, the method comprising the steps of:

utilizing said calendering means to provide said continuous strip (12) of elastomeric material having a profiled surface (62) and a cross-sectional profile (66) including a center region (70) bounded by first and second lateral regions (72,74), said center region having a maximum thickness $T_1$ at least twice a minimum thickness $T_2$ of said first lateral region;

providing a press with a pressing surface (82) which mates with said profiled surface; and, utilizing said press to in-line cure a predetermined portion of said continuous strip of elastomeric material and preserve said cross-sectional profile by engaging said pressing surface with said predetermined portion, said predetermined portion having a length equal to or greater than a circumference of said associated tire building drum.

* * * * *